US011175011B2

(12) United States Patent
Kaneko et al.

(10) Patent No.: US 11,175,011 B2
(45) Date of Patent: Nov. 16, 2021

(54) LIGHT SOURCE DEVICE AND DISPLAY DEVICE

(71) Applicant: SHARP KABUSHIKI KAISHA, Sakai (JP)

(72) Inventors: Tadashi Kaneko, Sakai (JP); Takahiro Imanishi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/000,927

(22) Filed: Aug. 24, 2020

(65) Prior Publication Data

US 2021/0123581 A1    Apr. 29, 2021

Related U.S. Application Data

(60) Provisional application No. 62/927,263, filed on Oct. 29, 2019.

(51) Int. Cl.
| | |
|---|---|
| *G02F 1/13357* | (2006.01) |
| *F21V 5/04* | (2006.01) |
| *F21K 9/69* | (2016.01) |
| *F21V 33/00* | (2006.01) |

(52) U.S. Cl.
CPC .............. *F21V 5/046* (2013.01); *F21K 9/69* (2016.08); *G02F 1/1336* (2013.01); *G02F 1/133602* (2013.01); *G02F 1/133603* (2013.01); *G02F 1/133606* (2013.01); *G02F 1/133611* (2013.01); *F21V 33/0052* (2013.01)

(58) Field of Classification Search
CPC .............. F21V 5/046; G02F 1/133606; G02F 1/133603; G02F 1/1336
See application file for complete search history.

(56) References Cited

U.S. PATENT DOCUMENTS

| | | | |
|---|---|---|---|
| 7,607,799 B2 | 10/2009 | Ohkawa | |
| 9,683,715 B2 * | 6/2017 | Min | .................. G02B 19/0028 |
| 2008/0298060 A1 | 12/2008 | Ohkawa | |

(Continued)

FOREIGN PATENT DOCUMENTS

| | | | | |
|---|---|---|---|---|
| JP | 2007-115424 A | | 5/2007 | |
| JP | WO 2013051437 | * | 4/2013 | ............... H04N 5/66 |

(Continued)

OTHER PUBLICATIONS

English Machine Translation of WO 2013051437 provided by ESPACENET (Year: 2013).*

*Primary Examiner* — Zheng Song

(74) *Attorney, Agent, or Firm* — ScienBiziP, P.C.

(57) ABSTRACT

A light source device includes: a substrate; a light source on the substrate, the light source emitting light in a direction away from the substrate; an optical element covering the light source on an opposite side of the light source from the substrate to control distribution of the light emitted by the light source; and a light absorption member that absorbs light, wherein the optical element has a bottom face on a substrate side thereof and a light-exiting face on an opposite side of the bottom face from the substrate, the optical element transmits the light emitted by the light source so that the transmitted light exits the optical element through the light-exiting face, and the light absorption member is disposed between the substrate and the bottom face.

2 Claims, 14 Drawing Sheets

(56) References Cited

U.S. PATENT DOCUMENTS

| | | | |
|---|---|---|---|
| 2010/0061096 A1* | 3/2010 | Sato | G02B 6/0043 |
| | | | 362/235 |
| 2011/0044053 A1* | 2/2011 | Yamaguchi | G02B 19/0014 |
| | | | 362/296.05 |
| 2012/0206673 A1* | 8/2012 | Ogata | H01L 33/62 |
| | | | 349/69 |
| 2015/0219966 A1 | 8/2015 | Song et al. | |
| 2015/0268513 A1* | 9/2015 | Chang | H01L 25/0753 |
| | | | 362/97.1 |
| 2016/0147115 A1* | 5/2016 | Lee | G02F 1/133608 |
| | | | 362/97.2 |
| 2016/0201875 A1* | 7/2016 | Kang | G02B 7/022 |
| | | | 362/311.06 |
| 2018/0252965 A1* | 9/2018 | Zheng | G02F 1/133603 |
| 2018/0347786 A1* | 12/2018 | Feng | F21V 13/04 |
| 2019/0041029 A1* | 2/2019 | Feng | F21V 7/28 |
| 2019/0353326 A1 | 11/2019 | Feng | |
| 2020/0158311 A1 | 5/2020 | Feng | |
| 2020/0158313 A1* | 5/2020 | Feng | F21V 5/007 |
| 2020/0217463 A1* | 7/2020 | Yeon | F21V 5/04 |

FOREIGN PATENT DOCUMENTS

| | | | |
|---|---|---|---|
| JP | 2015149472 A | 8/2015 | |
| JP | 2018195427 A | 12/2018 | |
| WO | 2019/025325 A1 | 2/2019 | |

\* cited by examiner

FIG.4
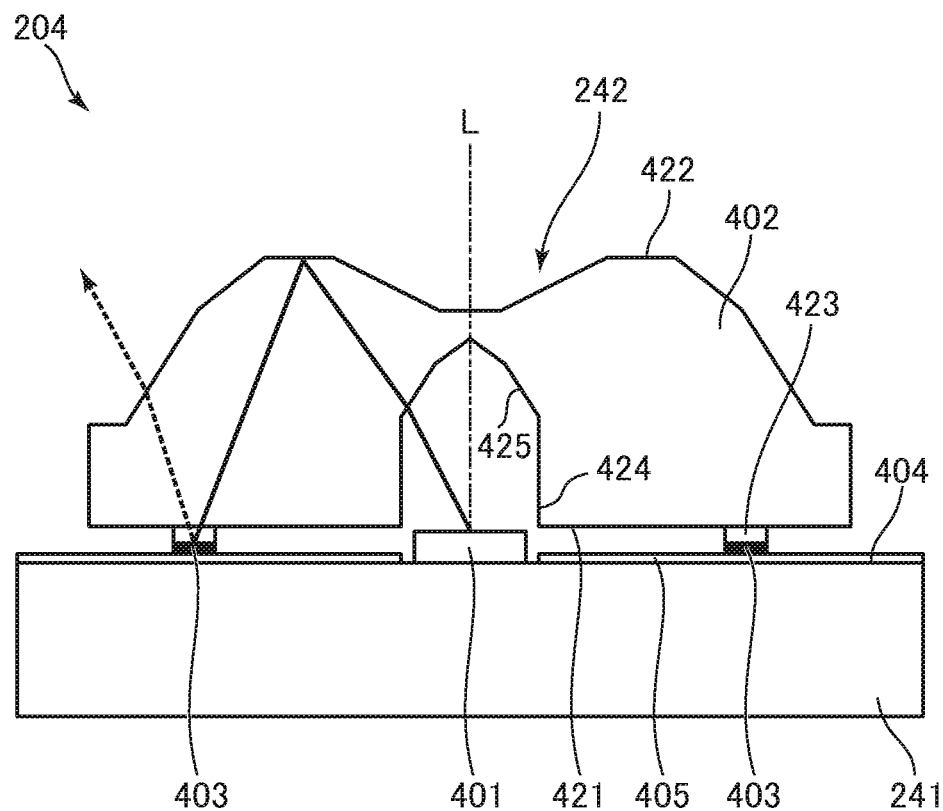
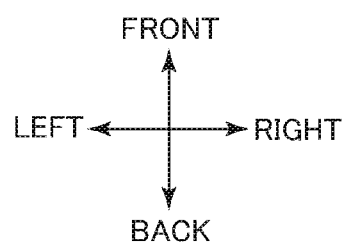

FIG.5
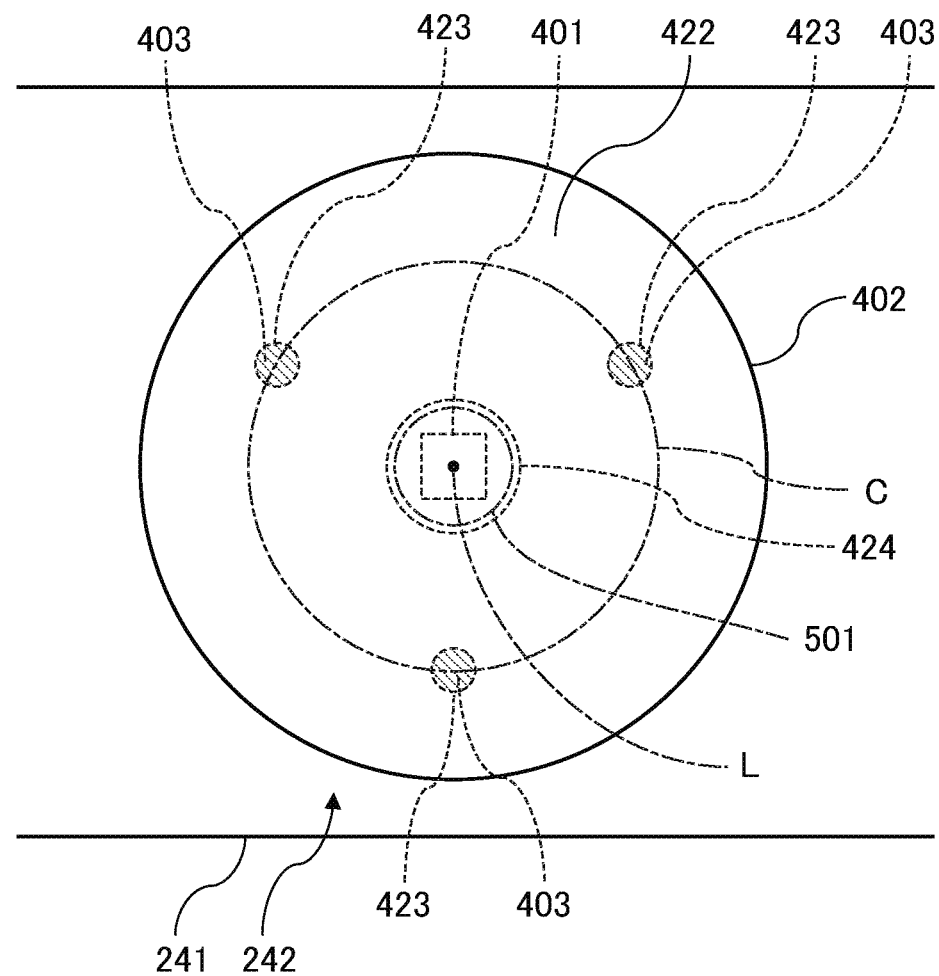
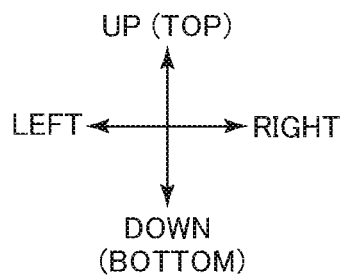

FIG.6
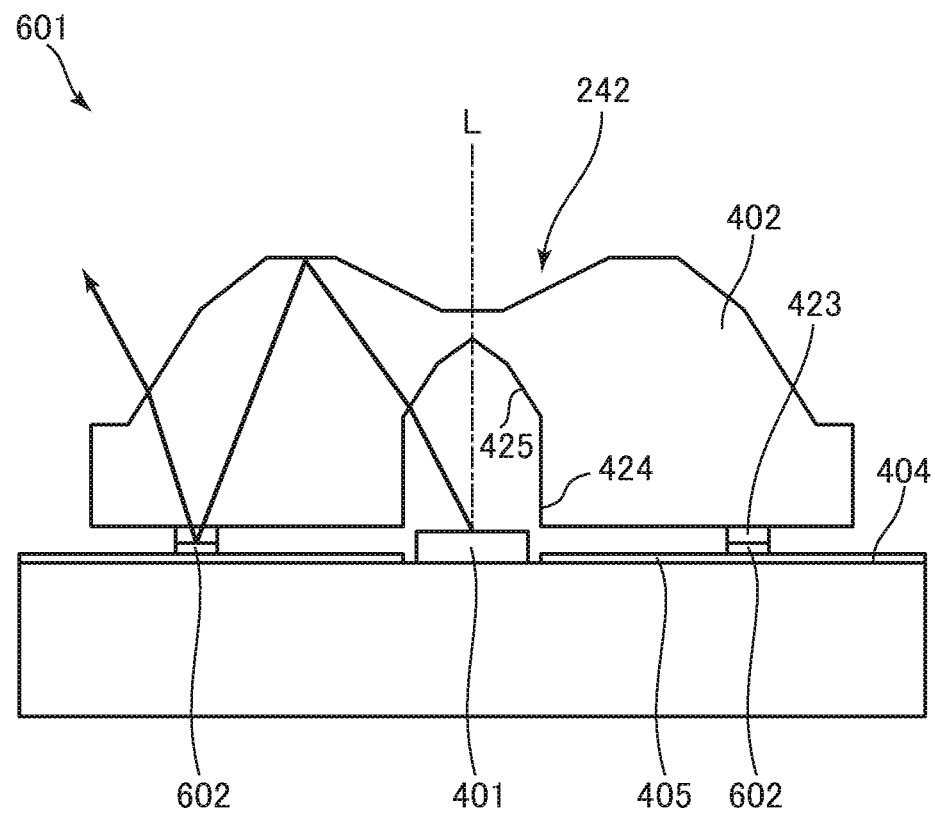
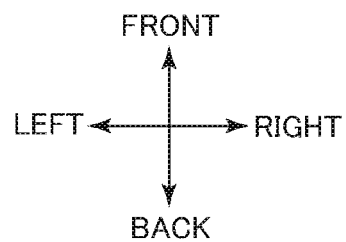

------- WHITE ADHESIVE  ———— BLACK ADHESIVE
(COMPARATIVE EXAMPLE)

------- WHITE ADHESIVE  ———— BLACK ADHESIVE
(COMPARATIVE EXAMPLE)

FIG.9
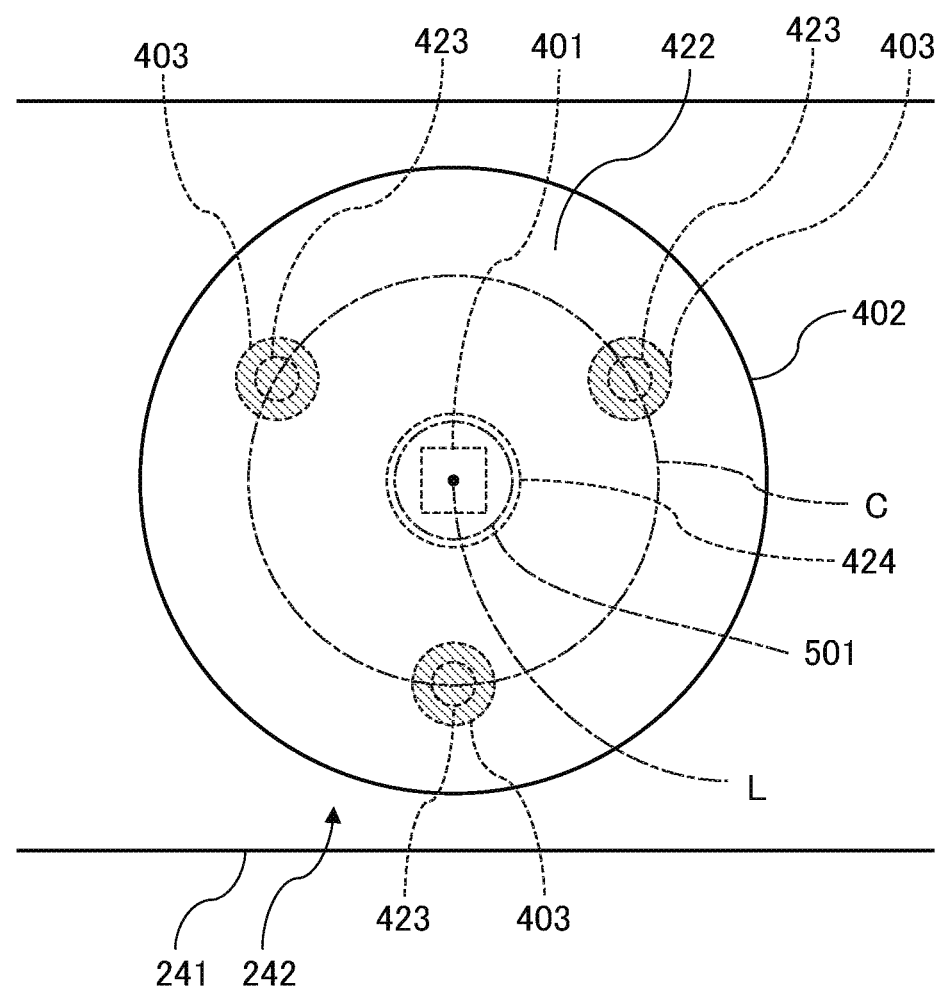
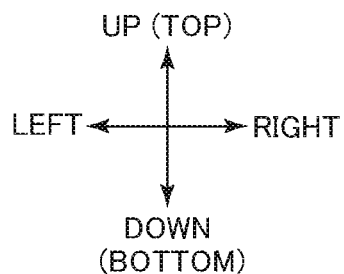

FIG.10
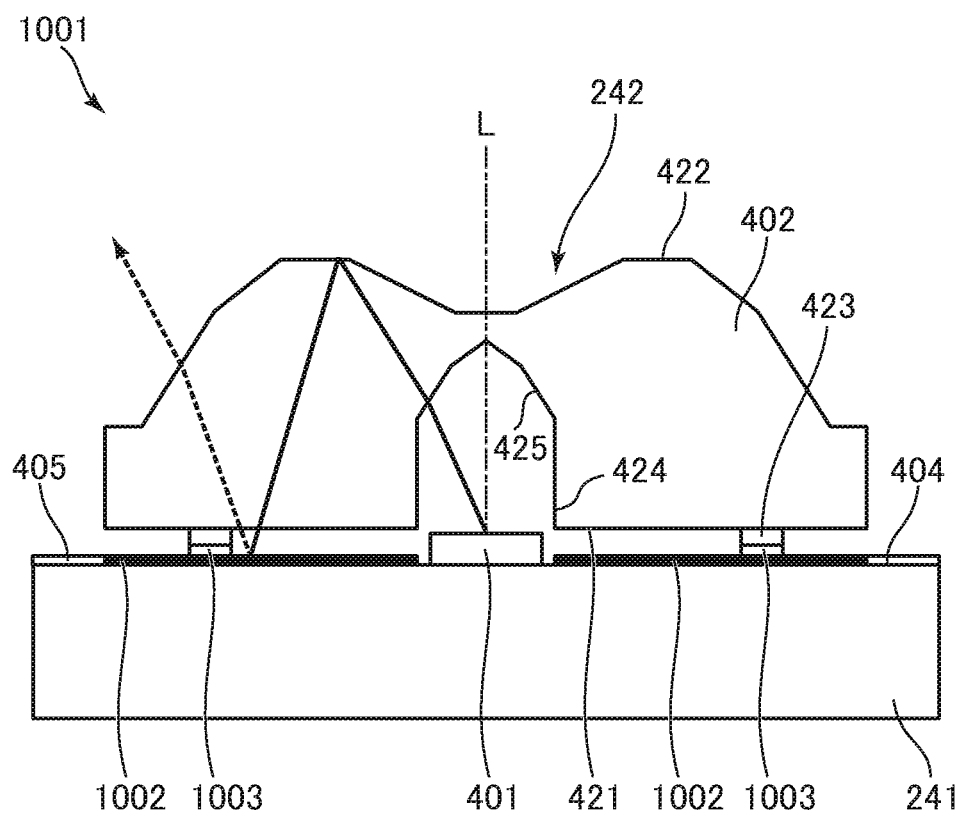
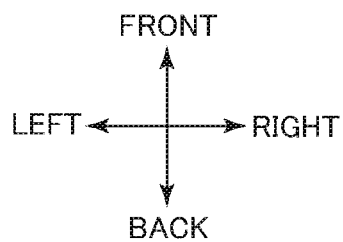

FIG.11
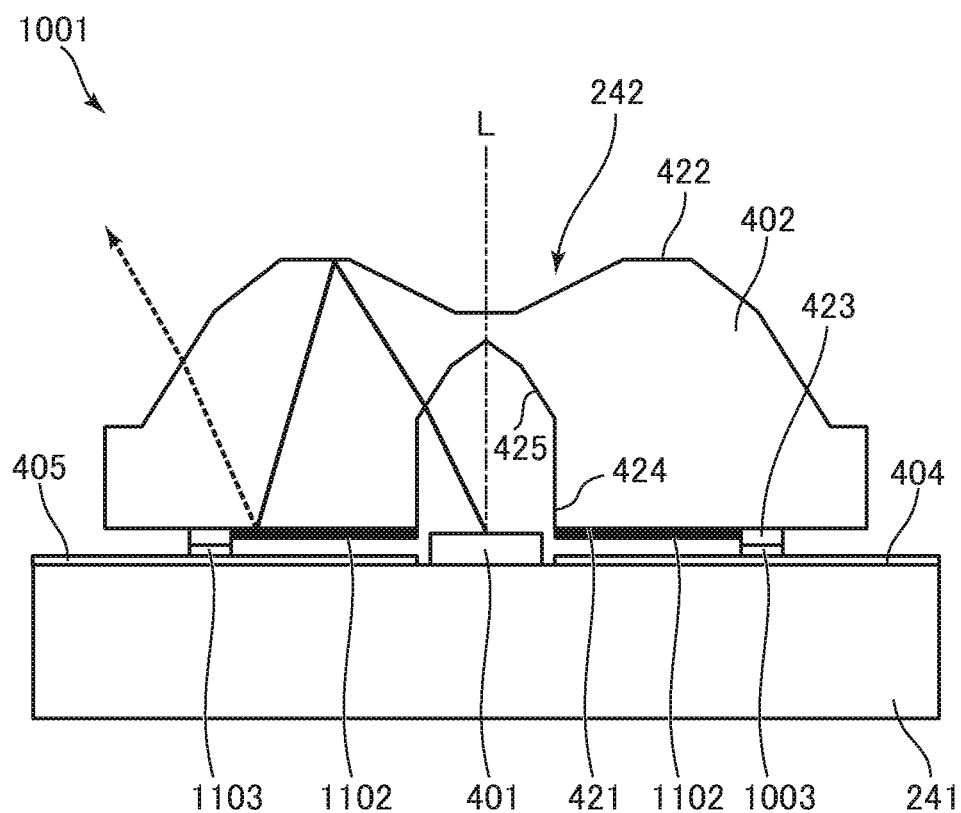
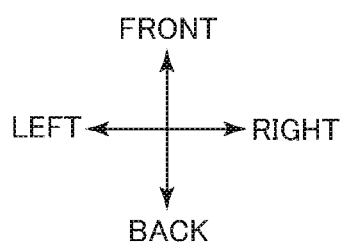

FIG.12
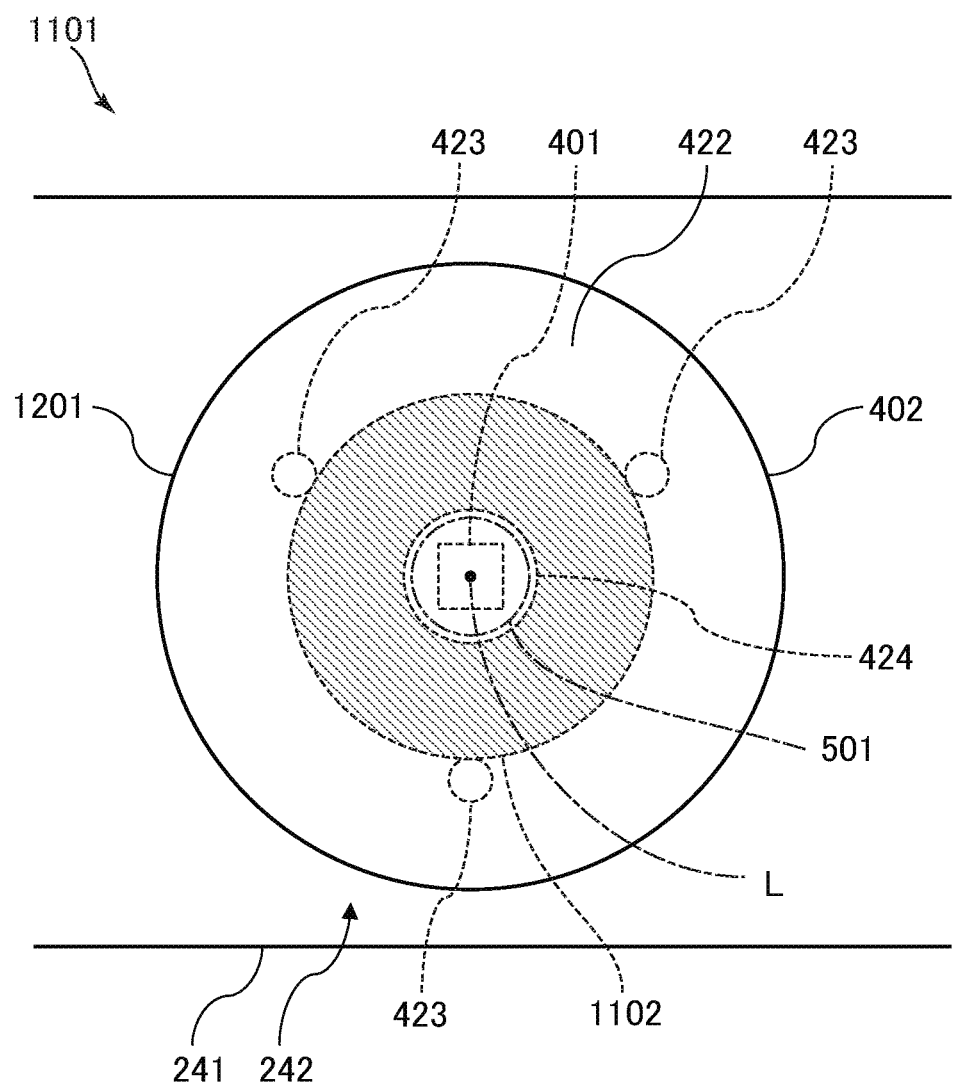
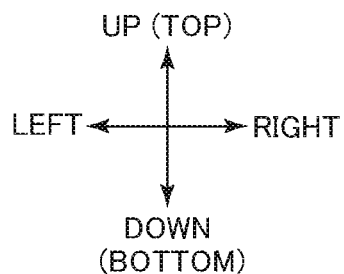

FIG.13
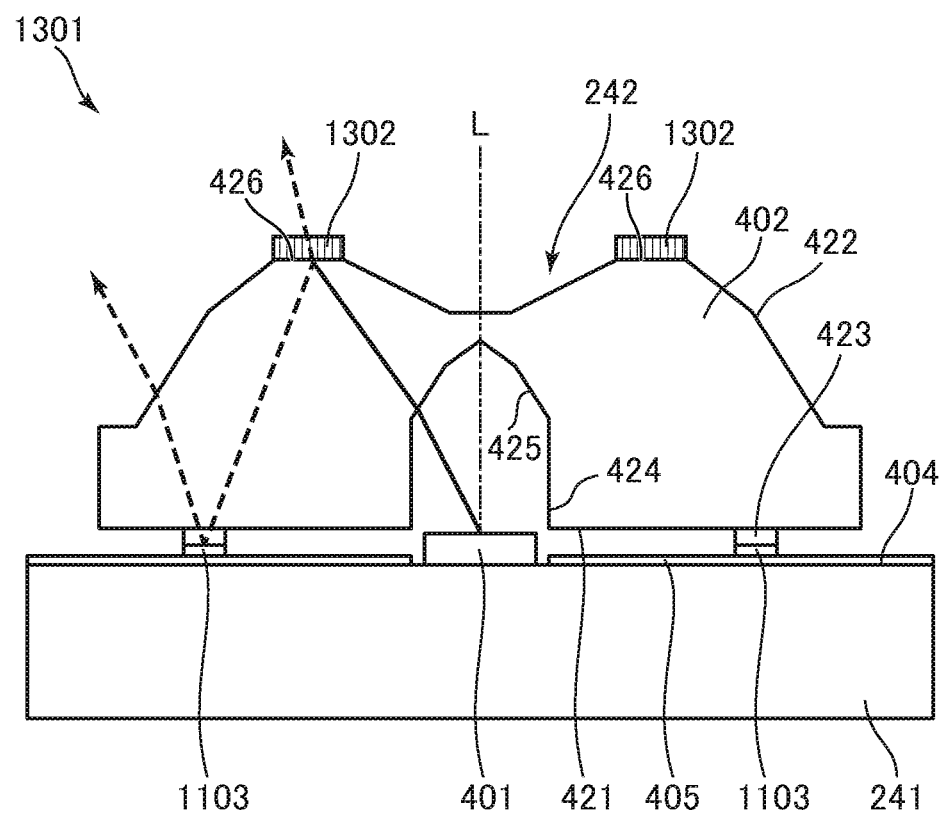
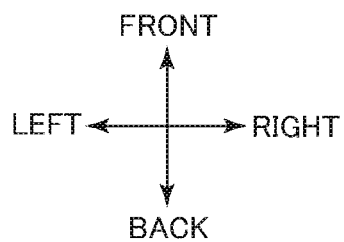

FIG.15
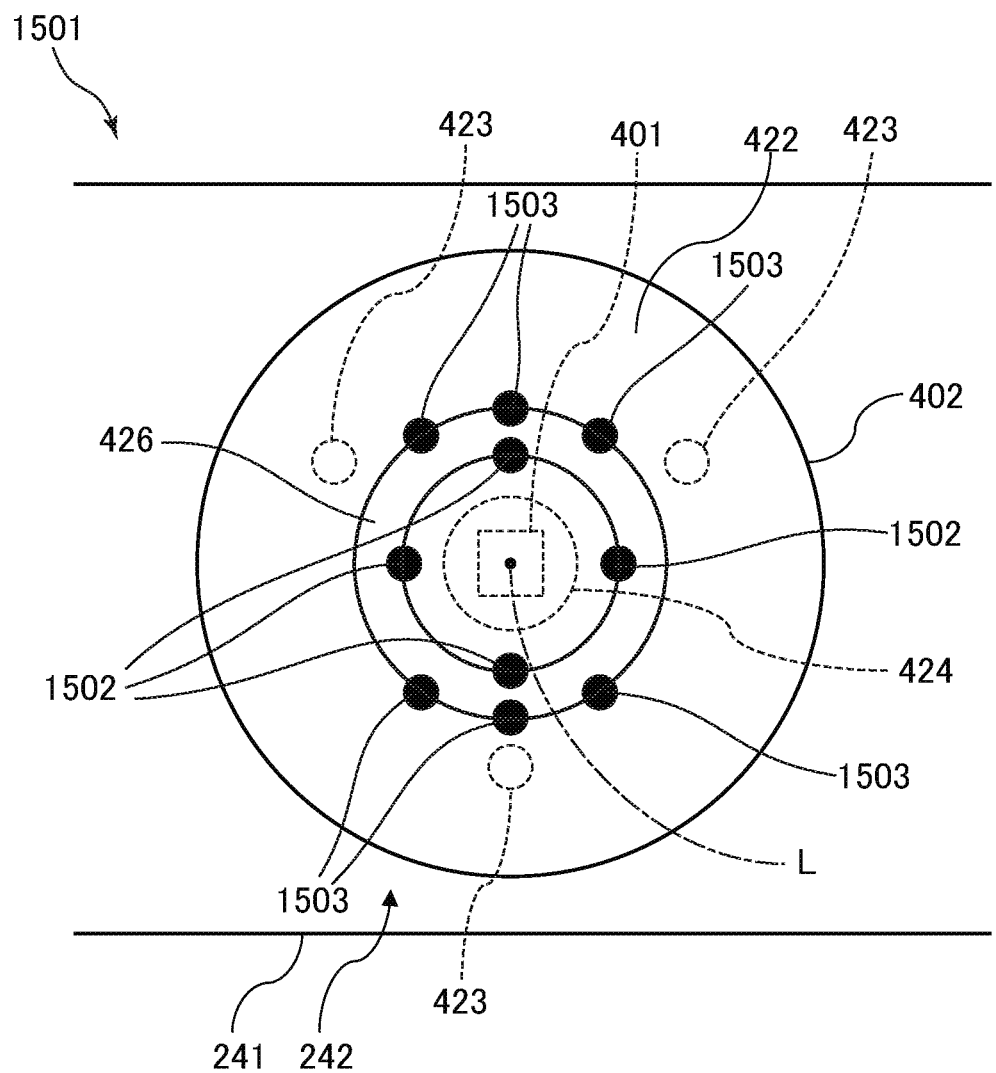
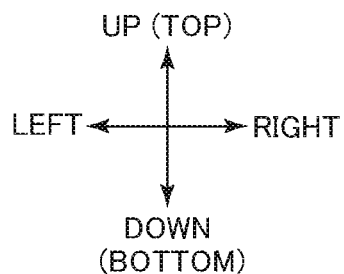

LIGHT SOURCE DEVICE AND DISPLAY DEVICE

CROSS-REFERENCE TO RELATED APPLICATION

The present application claims priority from Provisional Application No. 62/927,263, the content to which is hereby incorporated by reference into this application.

BACKGROUND OF THE INVENTION

1. Field of the Invention

The present invention relates to light source devices, illumination devices, and display devices.

2. Description of the Related Art

Illumination devices have been known that illuminate an illuminated member (e.g., a liquid crystal display panel). An example of such an illumination device is described in Document 1 (Japanese Unexamined Patent Application Publication No. 2007-115424). The illumination device described in Document 1 includes: LEDs (light emitting diodes) as point light sources; a lens unit for controlling the light flux emitted by the LEDs; and a light diffusion member for diffusing the light transmitted by the lens unit. The illumination device relies on the light emitted by the light diffusion member to illuminate an illuminated member. There is provided a dent in a face of the lens unit. The shape of this dent is designed in accordance with the optical properties of the LEDs such as the angle of emergence of light of the LEDs. This design translates into a range of the angle of emergence of the light emitted by the lens unit.

SUMMARY OF THE INVENTION

In Document 1, if these LEDs are replaced by those with different optical properties (e.g., with a different range of the angle of emergence of light and a different quantity of emitted light) without modifying the lens unit, the range of the angle of emergence of the light emitted by the lens unit may change. For instance, if the range of the angle of emergence is too small that the lens unit cannot sufficiently expand the light from the LEDs, the resultant luminance can be non-uniform. More specifically, the luminance can be high in the vicinity of the optical axis and differ much between the vicinity of the optical axis and locations far from the optical axis, when viewed parallel to the optical axis. Therefore, if the LEDs are arranged in a matrix to form an area light source, the resultant illumination light may become non-uniform due to the high luminance in the vicinity of the optical axis.

The present invention, in an aspect thereof, has an object, among others, to provide a light source device, illumination device, and display device capable of suppressing non-uniform luminance without having to modify optical elements.

The present invention, in a first aspect thereof, is directed to a light source device including: a substrate; a light source on the substrate, the light source emitting light in a direction away from the substrate; an optical element covering the light source on an opposite side of the light source from the substrate to control distribution of the light emitted by the light source; and a light absorption member that absorbs light, wherein the optical element has a bottom face on a substrate side thereof and a light-exiting face on an opposite side of the bottom face from the substrate, the optical element transmits the light emitted by the light source so that the transmitted light exits the optical element through the light-exiting face, and the light absorption member is disposed between the substrate and the bottom face.

In a second aspect of the present invention, the light source device of the first aspect is configured such that the light absorption member is disposed in a different location than the light source when viewed parallel to an emission direction of the light emitted by the light source.

In a third aspect of the present invention, the light source device of the first or second aspect is configured such that the optical element has a light-incident region to which the light emitted by the light source is directly incident, and the light absorption member is disposed in a different location than the light-incident region when viewed parallel to an emission direction of the light emitted by the light source.

In a fourth aspect of the present invention, the light source device of the third aspect is configured such that the optical element is disposed in a location containing the light-incident region and provided with a concave section that opens in the bottom face, and the light absorption member is disposed between an outer periphery of the optical element and the concave section when viewed parallel to the emission direction.

In a fifth aspect of the present invention, the light source device of any one of the first to fourth aspects is configured such that the light absorption member is a fixing member fixing the optical element to the substrate.

In a sixth aspect of the present invention, the light source device of the fifth aspect is configured such that the optical element has a leg projecting from the bottom face toward the substrate, and the fixing member fixes the leg and the substrate.

In a seventh aspect of the present invention, the light source device of any one of the first to sixth aspects is configured such that the light absorption member is disposed on the substrate.

In an eighth aspect of the present invention, the light source device of any one of the first to fourth aspects is configured such that the light absorption member is disposed on the bottom face.

The present invention, in a ninth aspect thereof, is directed to a light source device including: a substrate; a light source on the substrate, the light source emitting light in a direction away from the substrate; an optical element covering the light source on an opposite side of the light source from the substrate to control distribution of the light emitted by the light source; and a light absorption member on a surface of the optical element, the light absorption member absorbing light.

In a tenth aspect of the present invention, the light source device of the ninth aspect is configured such that the surface of the optical element has a bottom face on a substrate side thereof and a light-exiting face on an opposite side of the bottom face from the substrate, the optical element transmits the light emitted by the light source so that the transmitted light exits the optical element through the light-exiting face, and the light absorption member is disposed on a part of the light-exiting face.

In an eleventh aspect of the present invention, the light source device of the ninth or tenth aspect is configured such that the surface of the optical element has a flat face, and the light absorption member is disposed on the flat face.

The present invention, in another aspect thereof, is directed to an illumination device including: the light source device of any one of the first to eleventh aspects; and a light diffusion member opposite the light-exiting face of the light source device.

The present invention, in a twelfth aspect thereof, is directed to a display device including: an illumination device including: a light source device according to claim 1; and a light diffusion member opposite the light-exiting face of the light source device, the light diffusion member diffusing light; and a display panel that modulates light emitted by the illumination device to display an image.

BRIEF DESCRIPTION OF DRAWINGS

FIG. 4 is a schematic diagram of the light source device in accordance with the first embodiment.

FIG. 5 is a schematic diagram of the light source device in accordance with the first embodiment.

FIG. 6 is a schematic diagram of a light source device in accordance with a comparative example.

FIG. 9 is a schematic diagram of a light source device in accordance with a variation example of the first embodiment.

FIG. 10 is a schematic diagram of a light source device in accordance with a second embodiment.

FIG. 11 is a schematic diagram of a light source device in accordance with a third embodiment.

FIG. 12 is a schematic diagram of the light source device in accordance with the third embodiment.

FIG. 13 is a schematic diagram of a light source device in accordance with a variation example of the third embodiment.

FIG. 15 is a schematic diagram of a light source device in accordance with another variation example of the third embodiment.

DETAILED DESCRIPTION OF THE INVENTION

Figure 1:
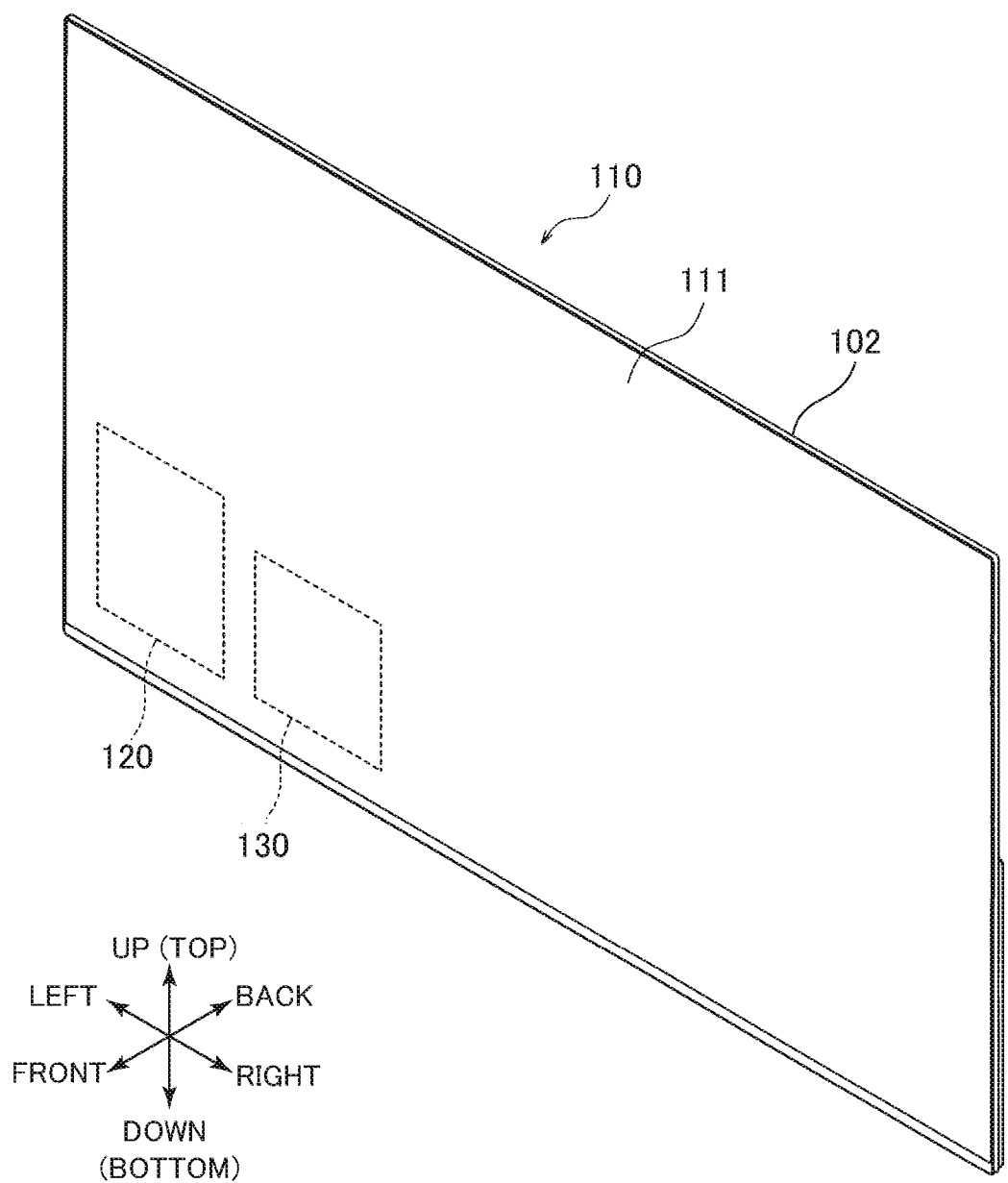
FIG. 1 is a schematic diagram of an exemplary television monitor that includes a display device in accordance with a first embodiment.

The following will describe an illumination device and a display device in accordance with an aspect of the present invention in reference to drawings. The following description will use directional terms, front, back, left, right, top (up), and bottom (down) as indicated by arrows in the drawings. Identical or equivalent elements in the drawings are denoted by the same reference numerals, and description thereof is not repeated. The scope of the present invention is not limited by the embodiments detailed later. The embodiments may be altered, for example, in such a manner as to achieve the same function and effect, without departing from the technical concept of the present invention.

First Embodiment

The following will describe a first embodiment of an illumination device and display device in accordance with an aspect of the present invention. FIG. 1 is a schematic illumination of the exterior of the television monitor that includes an illumination device and a display device in accordance with the first embodiment. Referring to FIG. 1, a television monitor 101 includes a display device 110, a reception unit 120, and a signal processing unit 130. The display device 110 has a display surface 111 where images are displayed.

The television monitor 101 includes a front cabinet 102 on the front thereof and a rear cabinet (not shown) on the back thereof. The front cabinet 102 is a frame-shaped housing and provided so as to cover the top, bottom, left, and right faces of the display device 110 from the front. The rear cabinet is disposed behind the display device 110 to cover the rear face of the display device 110 and to cover the reception unit 120 and the signal processing unit 130.

The television monitor 101 is, for example, either mounted on a stand (not shown) or hung on a wall using wall brackets (not shown). With the television monitor 101 hence fixed, for example, the display surface 111 of the display device 110 faces forward (front), and the depth (thickness), the width, and the height of the display device 110 coincide respectively with the front-back direction, the left-right direction, and the up-down direction.

The reception unit 120 is a circuit substrate carrying a receiver circuit mounted thereon. The reception unit 120 receives television broadcasts from outside via an antenna (not shown) and outputs broadcast signals based on the received television broadcasts.

The signal processing unit 130 is a circuit substrate carrying a signal processing circuit mounted thereon. The signal processing unit 130 performs a prescribed process on the broadcast signals outputted from the reception unit 120 to output video data. The video reproduced from the video data outputted from the signal processing unit 130 is displayed on the display surface 111 of the display device 110.

Structure of Display Device

Figure 2:
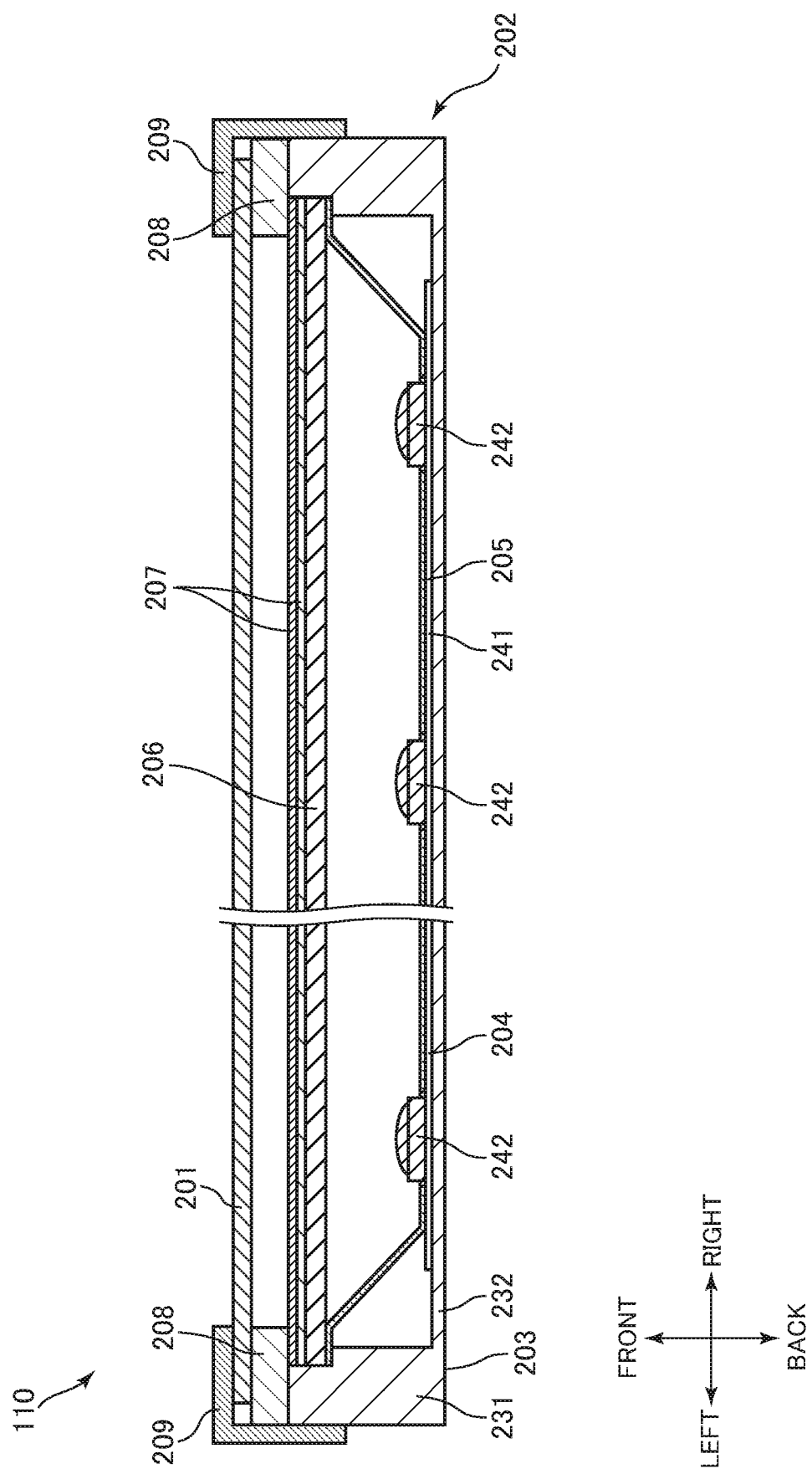
FIG. 2 is a schematic diagram of a structure of the display device in accordance with the first embodiment.

FIG. 2 is a schematic cross-sectional view of an example of the display device 110. The display device 110 includes at least a display panel 201 and a backlight 202. As shown in FIG. 2, the display device 110 further includes a bezel 209 for fixing the display panel 201 to the backlight 202.

The display panel 201 has a substantially rectangular external shape when viewed in a plan view along the front-back direction and displays images on the display surface 111 (see FIG. 1). The display panel 201 includes, for example, a liquid crystal panel and a pair of polarizers disposed so as to sandwich the liquid crystal panel in the front-back direction. The liquid crystal panel includes: a color filter substrate having a color filter formed thereon; an array substrate having a TFT array formed thereon; and a liquid crystal layer sandwiched between these substrates.

The bezel 209 is a frame-shaped member surrounding the top, bottom, left, and right faces of the display panel 201. The bezel 209 is attached to a chassis 203 (detailed later) of the backlight 202, for example, on the front of the display panel 201.

Structure of Backlight

The backlight 202 includes the chassis 203, a light source device 204, a reflective sheet 205, a diffusion plate 206, a set of optical sheets 207, and a frame 208. The backlight 202 is an embodiment of the illumination device in accordance with an aspect of the present invention and includes at least the light source device 204 and the diffusion plate 206. The backlight 202 is disposed behind the display panel 201 to guide the light emitted by the light source device 204 such that the light illuminates the display panel 201 via the diffusion plate 206 (illumination light).

The chassis 203 is a substantially box-shaped housing that is open in the front and supports the members constituting the backlight 202. The chassis 203 includes a bottom portion 231 and side portions 232. The bottom portion 231 is a rectangular platelike member disposed with the length thereof coinciding with the left-right direction and has the light source device 204 disposed in a flat portion on the front. The side portions 232 rise forward from the outer peripheral rim of the bottom portion 231 so as to surround the front face of the bottom portion 231.

The light source device 204 includes substrates 241, LED (light emitting diode) light sources 242, and light absorption members 403 (see FIG. 4). The light source device 204 includes a plurality of LED light sources 242 in the present embodiment. The LED light sources 242 are arranged in a matrix on the front side of the bottom portion 231. The light source device 204 will be described later in detail.

The reflective sheet 205 is disposed covering the bottom portion 231 and the side portions 232 of the chassis 203, to reflect light inside the chassis 203 in the front direction. The reflective sheet 205 has, for example, a white front face for excellent light reflection. The reflective sheet 205 has openings in locations corresponding to the LED light sources 242. The LED light sources 242 are exposed in the openings.

The diffusion plate 206 is an example of a light diffusion member and diffuses light that travels through the diffusion plate 206. The diffusion plate 206 includes, for example, a rectangular platelike, substantially transparent, resin base member and numerous diffusion particles dispersed on the base member. The diffusion plate 206 has a peripheral rim supported by the chassis 203 and disposed in front of the light source device 204.

The set of optical sheets 207 is a stack of optical sheets disposed in front of the diffusion plate 206. The set of optical sheets 207 includes, for example, a microlens sheet, a prism sheet, a reflective polarizer sheet, a diffusion sheet, and an antireflective sheet.

The frame 208 is a frame-shaped member extending, for example, along the outer peripheral rim of the display panel 201 and the set of optical sheets 207. The frame 208 holds the diffusion plate 206 and the set of optical sheets 207 by sandwiching the diffusion plate 206 and the set of optical sheets 207 between the frame 208 and the chassis 203. The frame 208 also holds the display panel 201 by sandwiching the display panel 201 between the frame 208 and the bezel 209.

Structure of Light Source Device

Figure 3:
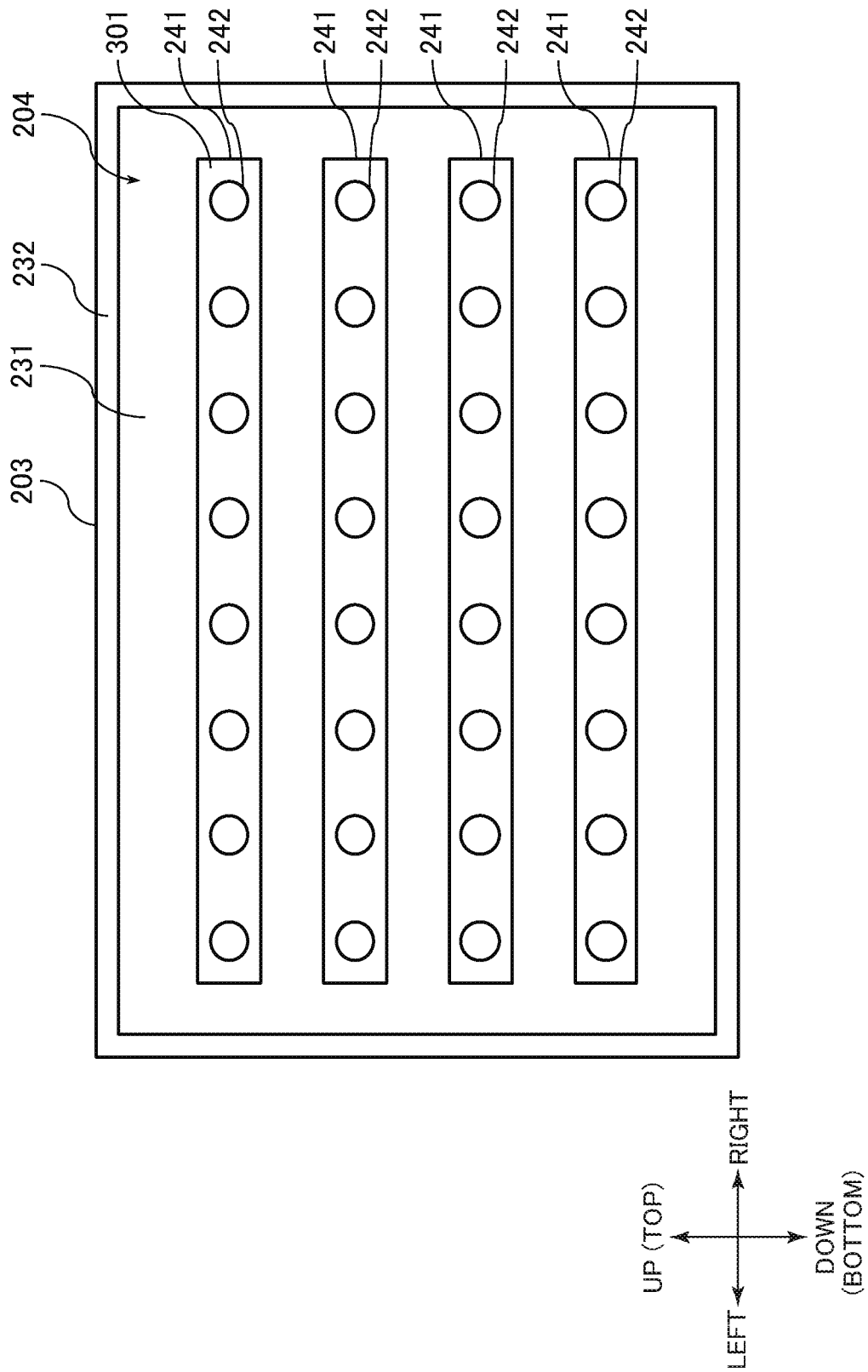
FIG. 3 is a schematic diagram of a chassis and a light source device in accordance with the first embodiment.

FIG. 3 is a schematic diagram of the chassis 203 and the light source device 204 as viewed from the front. The light source device 204 includes the substrates 241, the LED light sources 242, and the light absorption members 403 (see FIG. 4). The light source device 204 includes a plurality of substrates 241 and a plurality of LED light sources 242 on the substrates 241 in the example shown in FIG. 3. The quantities of light emitted by the LED light sources 242 in the light source device 204 can be adjusted by the light absorption members 403 absorbing part of the light, which will be described later in detail.

Each substrate 241 is, for example, a rectangular substrate with the longer side direction thereof being parallel to the left-right direction. On the substrate 241, the LED light sources 242 are provided at substantially equal intervals along the longer side direction of the substrate 241. The substrates 241 are disposed on the bottom portion 231 with the longer side direction thereof being parallel to the left-right direction. The substrates 241 are arranged adjacent to each other when viewed along the up-down direction. The LED light sources 242 are hence arranged in a matrix.

FIG. 4 is a schematic diagram of one of the LED light sources 242 in the light source device 204. FIG. 4 illustrates the effects of the LED light sources 242. FIG. 5 is a schematic diagram of one of the LED light sources 242 in the light source device 204 as viewed from the front. Referring to FIG. 4, each substrate 241 has a mounting face 404 on the front thereof. The LED light sources 242 are disposed on the mounting faces 404. The mounting face 404 has formed thereon a light-reflecting layer 405 having a high reflectance. The light-reflecting layer 405 is formed, for example, by applying ink containing a highly reflective material such as a white pigment to the mounting face 404.

The LED light source 242 includes an LED 401 and a lens 402. The LED 401 is an example of a light source and disposed on the mounting face 404 of the substrate 241. The LED 401 emits light away from the substrate 241, in other words, toward the front. In this example, FIGS. 4 and 5 schematically show only a light-emitting portion of the LED 401. Accordingly, the top face of the LED 401 provides a light-emitting region.

The LED 401 has an optical axis L in the front-back direction in the example shown in FIGS. 4 and 5. The direction parallel to the optical axis L is alternatively referred to as the optical axis direction which matches the front-back direction in the present embodiment. The optical axis matches the travelling direction of part of the light emitted by the LED 401 that exhibits a maximum (peak) intensity.

The lens 402 is an example of an optical element that controls the distribution of the light emitted by the LED 401. The lens 402 diffuses, and allows emergence of, the highly directional light emitted by the LED 401. The lens 402 is formed of, for example, a substantially transparent, light-transmitting material having a refractive index higher than air. The light-transmitting material is, for example, a synthetic resin material such as a polycarbonate or an acrylic. The light distribution by the lens 402 is adjusted by designing, for example, the refractive index and shape thereof in a suitable manner. The light distribution of the lens 402 is adjusted in a suitable manner in accordance with the optical properties of the LED 401, for example, such that the quantity of the light emitted by the LED light source 242 exhibits a desirable distribution on the light-incident face of the diffusion plate 206.

The lens 402 has a substantially circular shape when viewed in a plan view along the front-back direction, is disposed on the substrate 241 so as to overlap the LED 401 when viewed in the front-back direction, and covers the front face of the LED 401. In other words, the lens 402 covers the opposite face of the LED 401 from the substrate 241. The lens 402 is positioned such that the optical axis of the lens 402 matches the optical axis L of the LED 401.

The lens 402 includes a bottom face 421, a light-exiting face 422, and legs 423. The bottom face 421 of the lens 402 faces the substrate 241. There is provided a concave section 424 in the center of the bottom face 421. The bottom face 421 is substantially flat in the present embodiment and may alternatively have, for example, a plurality of grooves or convexities (concavities) to diffuse light.

The concave section 424 opens on the bottom face 421 and provides a dent extending toward the light-exiting face 422. The concave section 424 has an inner face 425 having a light-incident region 501 to which the light emitted by the LED 401 is directly incident (FIG. 5 shows the outer rim of the light-incident region 501 as an example). In other words, the light emitted by the LED 401 is incident to the light-incident region 501 without any intervening members. In other words, the concave section 424 is located in a region that includes the light-incident region 501 in the bottom face 421. The opening of the concave section 424 has a rim surrounding the light-emitting region of the LED 401 when viewed in a plan view along the front-back direction (see FIG. 5).

The light-incident region 501 is, for example, a region to which some of the light emitted by the LED 401 that travels in a prescribed angle range with respect to the emission direction in which the light emitted by the LED 401 has a maximum intensity (this direction matches the optical axis L in the present embodiment) is incident. The prescribed angle range is, for example, an angle range in which light is emitted with an emission intensity greater than or equal to a prescribed proportion (e.g., 50%) relative to the maximum emission intensity of the light emitted by the LED 401.

The light-exiting face 422 is located opposite the bottom face 421 from the substrate 241. The lens 402 transmits the light emitted by the LED 401 to allow emergence through the light-exiting face 422. Accordingly, the light entering through the inner face 425 of the concave section 424 transmits through the lens 402 and exits through the light-exiting face 422. Therefore, the optical properties of the lens 402 can be adjusted by designing the shape of the inner face 425, which is a part of the bottom face 421, and the shape of the light-exiting face 422 in a suitable manner.

The legs 423 project from the bottom face 421 toward the substrate 241. There is provided a plurality of legs 423 (three legs 423 in the present embodiment as an example, see FIG. 5). In the example shown in FIG. 5, the legs 423 are disposed in symmetric locations around the optical axis L when viewed in the front-back direction. In other words, the legs 423 are disposed in locations that substantially equally divide the circumference of an imaginary circle C that has a center on the optical axis L.

The light absorption member 403 absorbs at least part of the light incident to the light absorption member 403. The light absorption member 403 absorbs, for example, at least part of the light in the visible light region. The light absorption member 403 absorbs more light than the light-reflecting layer 405 on the substrate 241.

The light absorption member 403 is located between the bottom face 421 of the lens 402 and the substrate 241. Referring to FIG. 4, the light absorption member 403 absorbs at least part of the reflection off the light-exiting face 422 (not passing through the light-exiting face 422) toward the substrate 241 of the light emitted by the LED 401. In other words, even if light is reflected by the light absorption member 403 (denoted by a broken line in FIG. 4), the quantity of this reflected light is smaller than the quantity of the light incident to the light absorption member 403 (denoted by a solid line in FIG. 4).

The LED light source 242 allows less light to exit the LED light source 242 owing to the provision of the light absorption members 403 than in cases where there are provided no light absorption members 403. To describe it in more detail, some of the light reflected off the light-exiting face 422 is reflected and scattered by, for example, the bottom face 421 and the substrate 241 and exits through the light-exiting face 422 as the light emitted by the LED light source 242. The light absorption member 403 absorbs at least part of the light reflected off the light-exiting face 422 and entering the light absorption member 403. This mechanism lowers the quantity of the light emitted by the LED light source 242.

The light absorption member 403 further absorbs part of the light reflected and scattered by the bottom face 421 side of the lens 402 in the direction of the light-exiting face 422. This mechanism further lowers the quantity of light on the front side of the lens 402 (near the optical axis L) over the quantity of light along the periphery of the lens 402 (distanced from the optical axis L) when viewed in the front-back direction (the direction of the optical axis L).

The LED 401 may be in some cases replaced by an LED with different optical properties (e.g., a range of the angle of emergence of light and quantity of emitted light) due to, for example, a change in specifications. In such cases, if the lens is not modified in accordance with the optical properties of the LED, the range of the angle of emergence of the light emitted by the lens can change, which could in turn change the light quantity distribution in the location illuminated by the LED light source. For instance, if the lens cannot sufficiently expand the light emitted by the LED, resultant luminance is high near the optical axis of the LED. Because the backlight includes a matrix of LED light sources, the luminance of the illumination light from the backlight can be non-uniform if luminance is high near the optical axes of the LED light sources.

The LED light source 242, provided with the light absorption member 403, can further lower the quantity of light near the optical axis L over the quantity of light in locations distanced from the optical axis L when viewed along the optical axis L, as described above. Therefore, even if the lens 402 fails to sufficiently expand the light emitted by the LED 401, the present embodiment can restrain the luminance from increasing excessively near the optical axis L of the LED 401, thereby restraining the luminance of the illumination light from the backlight 202 from becoming non-uniform. This restraining of the luminance of the illumination light from the backlight 202 from becoming non-uniform can suppress non-uniform luminance in the display device 110.

The light absorption members 403 are disposed in different locations from the location of the LED 401 when viewed parallel to the optical axis L of the light emitted by the LED 401, in other words, when viewed in the optical axis direction of the LED 401 (see FIG. 5). This arrangement can restrain the light emitted by the LED 401 from being absorbed by the light absorption members 403 before the light enters the lens 402. The arrangement can hence restrain the quantity of the light emitted by the LED light source 242 from decreasing significantly due to absorption of the light before the light enters the lens 402.

The light absorption members 403 are disposed in different locations from the location of the light-incident region 501 when viewed in the optical axis direction (see FIG. 5). This arrangement can restrain the light emitted by the LED 401 from being absorbed by the light absorption members 403 before the light strikes the light-incident region 501 of the lens 402. The provision of the light absorption members 403 can hence further restrain the quantity of the light emitted by the LED light source 242 from decreasing significantly.

In the present embodiment, the light absorption member 403 is a fixing member for fixing the lens 402 to the substrate 241 and a black adhesive prepared by adding, for example, a black material to an adhesive. The light absorption members 403 are disposed in locations corresponding to the legs 423. In other words, the light absorption members 403 fix the legs 423 to the substrate 241. The light absorption members 403, doubling as fixing members, allow for a reduction in component count and manufacturing step count, thereby improving manufacturing efficiency.

Figure 7:
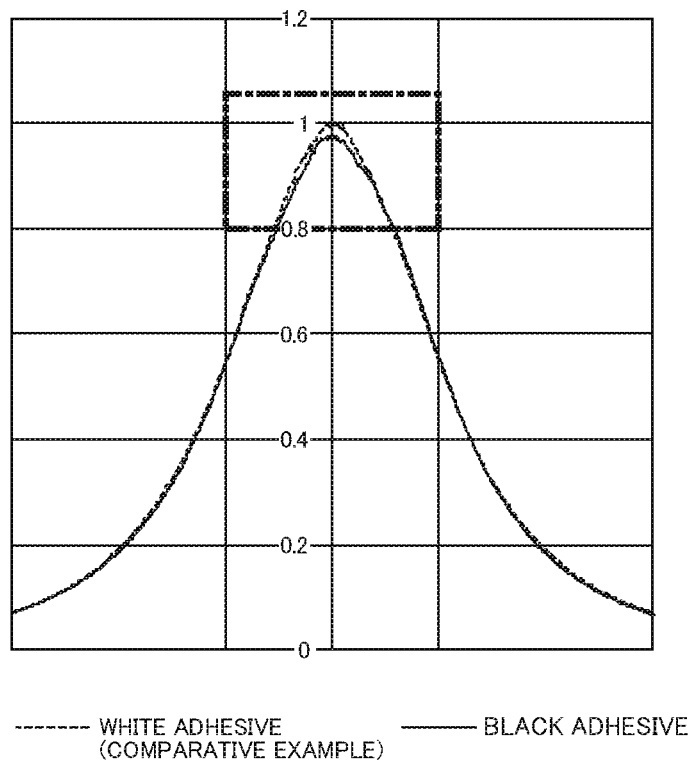
FIG. 7 is a diagram representing results of simulation on the distributions of the quantity of the light emitted by an LED light source in the light source device in accordance with the first embodiment and an LED light source in the light source device in accordance with the comparative example.
Figure 8:
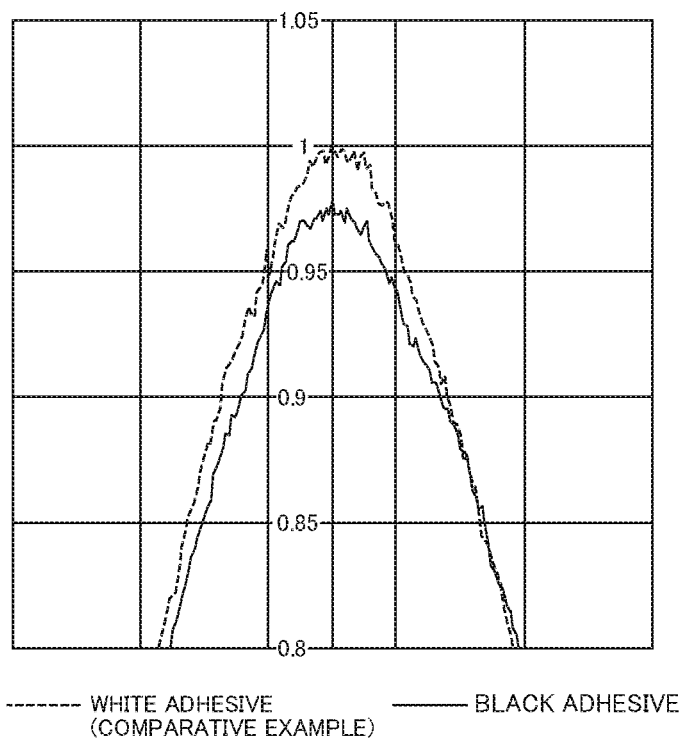
FIG. 8 is a diagram representing results of simulation on the distributions of the quantity of the light emitted by an LED light source in the light source device in accordance with the first embodiment and an LED light source in the light source device in accordance with the comparative example.

FIG. 6 is a schematic diagram of the surroundings of one of the LED light sources 242 in a light source device 601 in accordance with a comparative example. FIG. 7 is a diagram representing exemplary results of simulation on the distribution of the quantity of the light emitted by the LED light source 242 in the light source device 204 in accordance with the present embodiment and on the distribution of the quantity of the light emitted by an LED light source in the light source device 601 in accordance with the comparative example. FIG. 8 is a diagram showing the light quantity peaks in FIG. 7 in a scaled-up manner. In FIGS. 7 and 8, solid lines are used for the light source device 204 in accordance with the present embodiment, and broken lines are used for the light source device 601 in accordance with the comparative example. FIGS. 7 and 8 shows results of simulation on the distribution of light quantity on an imaginary plane perpendicular to the optical axis L in front of the LED light source 242. In addition, in FIGS. 7 and 8, the vertical axis represents the ratio of the quantity-of-light value in a location to the quantity-of-light value on the optical axis L (i.e., maximum quantity-of-light value), and the horizontal axis represents the distance from the optical axis L taken perpendicular to the optical axis L.

Referring to FIG. 6, the light source device 601 in accordance with the comparative example includes a white adhesive 602 in place of the light absorption member that serves as the black adhesive member in the light source device 204 in accordance with the present embodiment. The white adhesive 602 fixes the legs 423 to the substrate 241. In the light source device 601, the light reflected off the light-exiting face 422 in the direction of the substrate 241 and entering the white adhesive 602 is reflected primarily away from the substrate 241. Referring to FIGS. 7 and 8, the quantity of the light emitted by the LED light source 242 is reduced in the light source device 204 in accordance with the present embodiment when compared with the light source device 601 in accordance with the comparative example. Additionally, in the light source device 204, the reduction in the quantity of the light in comparison with the light source device 601 in accordance with the comparative example increases with a decreasing distance from the optical axis L.

As described above, the light source device 204 includes a matrix of LED light sources 242. Therefore, the distribution of the quantity of the light emitted by the light source device 204 can be rendered more flat by reducing the quantity of light in locations corresponding to the optical axes L of the LED light sources 242, in other words, by reducing the maximum quantity of light.

For instance, the lens 402 used typically exhibits a light distribution that matches the optical properties of the LED light source 242, which enables desirable adjustment of the distribution of the quantity of the light emitted by the light source device 204. There are some cases where the manufacturing efficiency can decrease (e.g., the manufacturing cost can increase or the manufacturing time increases) due to a new design of the lens 402 in accordance with the optical properties of the LED light source 242. The quantity of the light emitted by the LED light source 242 can be reduced in the light source device 204 by the provision of the light absorption members 403. Therefore, the quantity of light can be adjusted, and the manufacturing efficiency can be restrained from decreasing, with no new design of the lens 402 being necessary.

The light absorption members 403 are disposed in locations corresponding to the legs 423 to fix the legs 423 to the substrate 241. For instance, without the legs, the light absorption members 403, which are a black adhesive, attach the bottom face 421 to the substrate 241, and it can therefore be difficult to adjust the location of the adhesive due to, for example, wetting and spreading. In the present embodiment, the use of the light absorption members 403 to fix the legs 423 can suppress the wetting and spreading of the adhesive between the bottom face 421 and the substrate 241 and enables easy adjustment of the placement of the adhesive, which in turn enables the adjustment of the distribution of the quantity of the light emitted by the LED light source 242.

The light absorption members 403 are disposed, similarly to the legs 423, in symmetric locations around the optical axis L when viewed in the front-back direction. In other words, the light absorption members 403 are disposed in locations that substantially equally divide the imaginary circle C that has a center on the optical axis L. This arrangement can restrain the light quantity distribution from becoming non-uniform due to the light absorption members 403 being arranged in an uneven manner in a plane perpendicular to the optical axis L.

The number, shape, and locations of the legs 423 are not necessarily limited to the examples given in the present embodiment. For instance, there may be provided only one leg 423, two legs 423, four legs 423, or even more legs 423. There may be provided a plurality of legs 423 in any suitable locations. There may be provided no legs 423 at all.

The number, shape, and locations of the light absorption members 403 are not necessarily limited to the examples given in the present embodiment. For instance, the light absorption members 403 are not necessarily disposed right below the legs 423. Referring to FIG. 9, the light absorption members 403 may alternatively be provided around the legs 423, as well as right below the legs 423. The quantity of the light emitted by the LED light source 242 can be adjusted by adjusting the extent of the area of the locations of the light absorption members 403 in this manner. The provision of the legs 423 enables suppression of wetting and spreading of the adhesive in adjusting the extent of the area of the locations of the light absorption members 403, for example, in accordance with the application quantity of the light absorption members 403 which is an adhesive. The light absorption members 403 may be provided in different locations than the legs 423 to fix the bottom face 421 and the substrate 241.

Second Embodiment

A description will be given next of a second embodiment. Description of the members and features of the second embodiment that are similar to those of the first embodiment will be omitted in the following. The second embodiment differs from the first embodiment in that the light absorption member is a black paint applied to the surface of the substrate in the former.

FIG. 10 is a schematic diagram of a single LED light source 242 in a light source device 1001 in accordance with the second embodiment. Referring to FIG. 10, in the light source device 1001, there is provided a light absorption member 1002 on the substrate 241. The light absorption member 1002 is formed, for example, by applying a black paint to the mounting face 404 by printing. It is therefore easy to adjust the location of the light absorption member 1002.

The light absorption member 1002 in the example shown in FIG. 10 is provided, for example, in a location overlapping a region other than the concave section 424 in the bottom face 421 on the substrate 241 when viewed parallel to the optical axis. The light absorption member 1002 is shaped, for example, like a circular ring when viewed parallel to the optical axis.

Alternatively, the light absorption member 1002 may be provided, for example, in a location overlapping the concave section 424. Specifically, the light absorption member 1002 may be located, for example, external to the LED 401 on the substrate 241 when viewed from the optical axis L. The light absorption member 1002 may be located external to the lens 402 when viewed from the optical axis L.

The lens 402 in the example shown in FIG. 10 is fixed to the substrate 241 via the light absorption member 1002 by using a white adhesive 1003. By fixing the lens 402 using the white adhesive 1003, the light absorption member 1002 can be restrained from reducing the quantity of the light emitted by the LED light source 242, which in turn enables fine-tuning of the quantity of the light. A black adhesive may be used in place of the white adhesive 1003.

Third Embodiment

A description will be given next of a third embodiment. Description of the members and features of the third embodiment that are similar to those of the first embodiment will be omitted in the following. The third embodiment differs from the first embodiment in that the light absorption member is disposed on the bottom face of the lens in the former. The lens 402 in the example shown in FIG. 11 is fixed to the substrate 241 using a white adhesive 1103. A black adhesive may be used in place of the white adhesive 1103.

FIG. 11 is a schematic diagram of a single LED light source 242 in a light source device 1101 in accordance with the third embodiment. Referring to FIG. 11, in the light source device 1101, there is provided a light absorption member 1102 on the bottom face 421. The light absorption member 1102 is formed, for example, by applying a black paint to the bottom face 421.

The light absorption member 1102 absorbs, on the bottom face 421, part of the light emitted by the LED 401 that is reflected by the light-exiting face 422 toward the substrate 241 side. It is therefore easy to adjust the quantity of light absorbed by the light absorption member 1102 by adjusting, for example, the location, shape, and/or area of the light absorption member 1102 in a suitable manner. In addition, because the quantity of the light transmitted through the bottom face 421 and diffused to the surroundings can be reduced, the light quantity distribution of the light emitted by the light source device 204 can be adjusted in a more suitable manner.

FIG. 12 is a diagram of the LED light source 242 in the light source device 1101 when viewed parallel to the optical axis. The light absorption member 1102 is disposed between an outer periphery 1201 of the lens 402 and the edge of an opening of the concave section 424 when viewed parallel to the optical axis. The concave section 424 includes the light-incident region 501 in a part of the inner face 425. In other words, the light absorption member 1102 is located external to the light-incident region 501 when viewed from the optical axis L. The light absorption member 1102 can therefore restrain the light emitted by the LED 401 from being absorbed by the light absorption members 1102 before the light strikes the light-incident region 501 of the lens 402. Therefore, the provision of the light absorption member 1102 can restrain the quantity of the light emitted by the LED light source 242 from decreasing significantly.

The light absorption member 1102 is disposed around the concave section 424 along the edge of the opening of the concave section 424. There may be provided a gap between the light absorption member 1102 and the edge as viewed parallel to the optical axis. For instance, the light absorption member 1102 is provided at least in a region that is closer to the concave section 424 than is a middle section that is a middle position between the concave section 424 and the outer periphery 1201 on the bottom face 421 (the region may be referred to as an "internal region"). The quantity of the light that is reflected by the light-exiting face 422 toward the substrate 241 side and incident on the bottom face 421 is larger in the internal region than in the region external to the middle section (external region). Therefore, the provision of the light absorption member 1102 in the internal region can increase the quantity of the light absorbed by the light absorption member 1102 when compared with the provision thereof only in the external region. The light absorption member 1102 may be provided only in the external region.

Variation Examples of Third Embodiment

A description will be given next of a variation example of the third embodiment. The light absorption member 1102, in the third embodiment, is provided on the bottom face 421 which is a part of the surface of the lens 402 (optical element). Alternatively, the light absorption member may be provided in another part of the surface of the lens 402. Part of the light travelling from the inside to the outside of the lens 402 can be absorbed by the light absorption member provided on the surface of the lens 402, which enables the adjustment of the quantity of the light leaving the light source device. Desirable adjustment of the distribution of the quantity of the light emitted by the light source device is enabled by providing a light absorption member that matches the optical properties of the LED light source 242 and the light distribution properties of the lens 402 on the surface of the lens 402 in a suitable manner.

Figure 14:
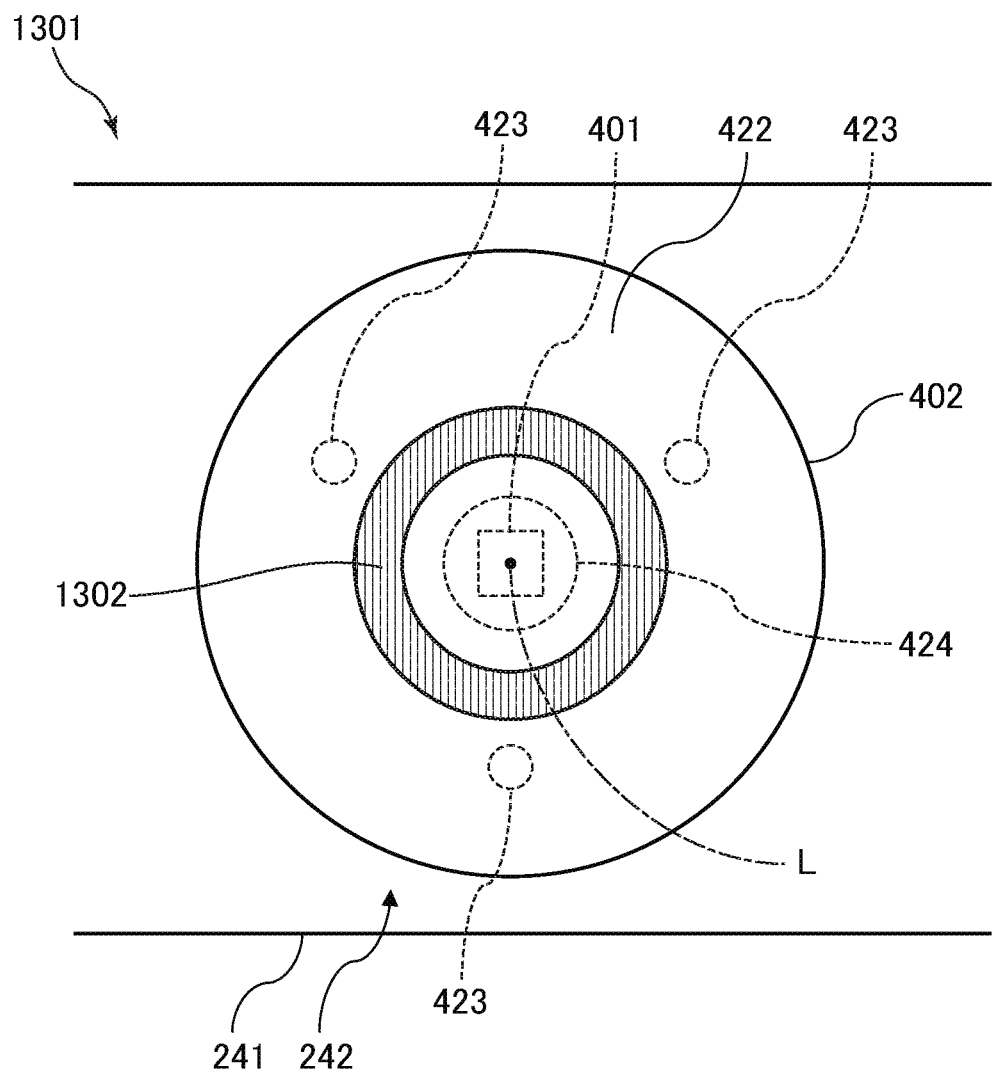
FIG. 14 is a schematic diagram of the light source device in accordance with the variation example of the third embodiment.

FIG. 13 is schematic diagram of an LED light source 242 in a light source device 1301 in accordance with a variation example of the third embodiment. FIG. 14 is a schematic diagram of the LED light source 242 in the light source device 1301 when the LED light source 242 is viewed from the front. In the light source device 1301, there is provided a light absorption member 1302 on a part of a light-exiting face 422 which is a part of the surface of the lens 402. Light is emitted by an LED 401, passes through the lens 402, and exits through the light-exiting face 422. The provision of the light absorption member 1302 on the light-exiting face 422 allows for an increase in the quantity of light absorbed by the light absorption member 1302 per unit area of the light absorption member 1302 (light absorption efficiency).

In the example shown in FIGS. 13 and 14, the light absorption member 1302 is provided on a flat face 426 which is a part of the surface of the lens 402. The flat face 426 is formed as a part of the light-exiting face 422 of the lens 402. In this variation example, the flat face 426 is provided in the most forward location on the lens 402 that includes the top portion of the lens 402. The flat face 426 is shaped generally like a circular ring around the optical axis L when viewed parallel to the optical axis L. In other words, the light absorption member 1302 is shaped generally like a circular ring when viewed parallel to the optical axis L, similarly to the flat face 426.

The light absorption member 1302 is formed by applying a light absorption material or attaching a light absorption sheet prepared by stacking a light absorption material on a base member. The light absorption member 1302 can be easily formed on the surface of the lens 402 by these methods. The provision of the light absorption member 1302 on the flat face 426 makes it easier to form the light absorption member 1302 in a desirable shape than the provision thereof, for example, on a curved surface. The light absorption member can be easily formed in a desirable shape in a similar manner even when the light absorption member is formed on the flat, bottom face 421 as in the third embodiment.

The location and shape of the light absorption member is not limited to the third embodiment and the variation example thereof. FIG. 15 is a schematic diagram of an LED light source 242 in a light source device 1501 in accordance with another variation example of the third embodiment. Referring to FIG. 15, a plurality of light absorption members 1502, 1503 may be provided on the surface of the lens 402 in a distributed manner. The light absorption members 1502 are provided on the same circumference around the optical axis L on the light-exiting face 422 when viewed parallel to the optical axis L. A plurality of light absorption members 1503 is likewise provided on the same circumference around the optical axis L on the light-exiting face 422 when viewed parallel to the optical axis L. The light absorption members may be provided on a side face of the lens 402. The light absorption members may be provided in such locations that the light absorption members overlap the LED 401 when viewed parallel to the optical axis L. The light absorption members may be provided in the concave section 424 of the lens 402.

Other Variation Examples

The illumination device and display device in accordance with an aspect of the present invention are not necessarily limited to the above-described embodiments and variation examples. Further variations obtained by modifying the embodiments and variation examples within the technical scope of the present invention are encompassed by the present invention.

The embodiments above describe structures including a plurality of LED light sources 242 as an example of a light source device in accordance with an aspect of the present invention. Alternatively, a structure may be used that includes a single LED light source 242.

The embodiments above describe liquid crystal display devices that include a liquid crystal panel as an example of a display device in accordance with an aspect of the present invention, which by no means limits the present invention. The liquid crystal display device may include, for example, a transmissive display panel other than a liquid crystal panel, such as an organic LED display device (organic light-emitting diode display).

The display device in accordance with an aspect of the present invention may be, for example, a signage device including a display panel that is a translucent film carrying an image formed thereon and a backlight for illuminating the display panel.

The embodiments above describe a backlight for a liquid crystal display device that includes a liquid crystal panel as an exemplary embodiment of an illumination device, which by no means limits the present invention. For instance, the illumination device in accordance with the aspects of the present invention may be applied in a suitable manner to the illumination device that includes a light source device and a diffusion plate and that diffuses the light from the light source device by the diffusion plate to project the diffused light as illumination light.

The embodiments above describe as an example an illumination device that includes a diffusion plate as a light diffusion optical member, which by no means limits the present invention. As an alternative example, the illumination device may include a light guide plate as a light diffusion member. In addition, the embodiments above describe an illumination device that, as an example, is a direct backlight that includes a light source behind a diffusion plate. An edge-type backlight may be used that includes a light source device beside a light guide plate.

What is claimed is:

1. A light source device comprising:
   a substrate;
   a light source on the substrate, the light source emitting light in a direction away from the substrate;
   an optical element covering the light source on an opposite side of the light source from the substrate to control distribution of the light emitted by the light source; and
   a light absorption member on a surface of the optical element, the light absorption member absorbing light,
   wherein:
   the surface of the optical element has a bottom face on a substrate side thereof and a light-exiting face on an opposite side of the bottom face from the substrate;
   the optical element transmits the light emitted by the light source so that the transmitted light exits the optical element through the light-exiting face; and
   the light absorption member is disposed on a part of the light-exiting face such that the light absorption member does not overlap the light source when viewed parallel to an emission direction of the light emitted by the light source.

2. The light source device according to claim 1, wherein the surface of the optical element has a flat face, and the light absorption member is disposed on the flat face.

* * * * *